United States Patent
Urano (10) Patent No.: US 8,439,570 B2
(45) Date of Patent: May 14, 2013

(54) ROLLING BEARING ASSEMBLY AND METHOD OF FORMING A LUBRICATION DEVICE THEREFOR

(75) Inventor: Hiroyuki Urano, Sakurai (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 105 days.

(21) Appl. No.: 12/737,536

(22) PCT Filed: Nov. 24, 2009

(86) PCT No.: PCT/JP2009/063111
§ 371 (c)(1),
(2), (4) Date: Jan. 21, 2011

(87) PCT Pub. No.: WO2010/064376
PCT Pub. Date: Jun. 10, 2010

(65) Prior Publication Data
US 2011/0206306 A1 Aug. 25, 2011

(51) Int. Cl.
*F16C 33/66* (2006.01)
(52) U.S. Cl.
USPC .................................................. 384/473
(58) Field of Classification Search ............... 384/473, 384/474, 470, 469, 462
See application file for complete search history.

(56) References Cited

U.S. PATENT DOCUMENTS

| | | | | |
|---|---|---|---|---|
| 2,858,175 | A | * | 10/1958 | Sutherland .................... 384/466 |
| 4,576,489 | A | * | 3/1986 | Bentele et al. ................ 384/469 |
| 2006/0239598 | A1 | * | 10/2006 | Matsuyama et al. .......... 384/462 |
| 2009/0103844 | A1 | * | 4/2009 | Kobayashi et al. ........... 384/462 |

FOREIGN PATENT DOCUMENTS

| | | |
|---|---|---|
| JP | 5-45246 U | 6/1993 |
| JP | 6-330951 A | 11/1994 |
| JP | 7-103228 A | 4/1995 |
| JP | 2005-180629 A | 7/2005 |
| JP | 2006-316846 A | 11/2006 |

* cited by examiner

*Primary Examiner* — Thomas R Hannon
(74) *Attorney, Agent, or Firm* — McGinn IP Law Group, PLLC (57) ABSTRACT

A rolling bearing assembly includes a rolling bearing which includes a plurality of rolling elements interposed between an inner ring and an outer ring thereof and retained by a cage, the cage being in a sliding contact with a guiding surface provided on an inner periphery of the outer ring and a lubrication device for supplying a lubricant to the rolling bearing. The lubrication device includes an annular groove extending along the inner periphery of the outer ring in adjoining relation with the guiding surface of the outer ring and storing a grease therein and an annular grease reservoir member disposed in proximity to the annular groove and storing a grease therein. The grease stored in the grease reservoir member and the grease stored in the annular groove are interconnected by the grease present between the reservoir and the annular groove.

5 Claims, 7 Drawing Sheets

RELATED ART

ROLLING BEARING ASSEMBLY AND METHOD OF FORMING A LUBRICATION DEVICE THEREFOR

TECHNICAL FIELD

The present invention relates to a rolling bearing assembly equipped with a lubrication device for lubricating a rolling bearing and a method of forming the lubrication device.

BACKGROUND ART

Grease lubrication has been widely used as a lubrication method for rolling bearing. The grease lubrication requires periodical grease replenishment because the grease is quickly deteriorated under such environments as high-temperature, high-speed rotation, and high load conditions, and shortened in service life. In this connection, there has been provided a rolling bearing assembly which is equipped with a lubrication device capable of continuously supplying base oil of the grease to a rolling bearing (see, for example, Patent Literature 1).

Figure 7:
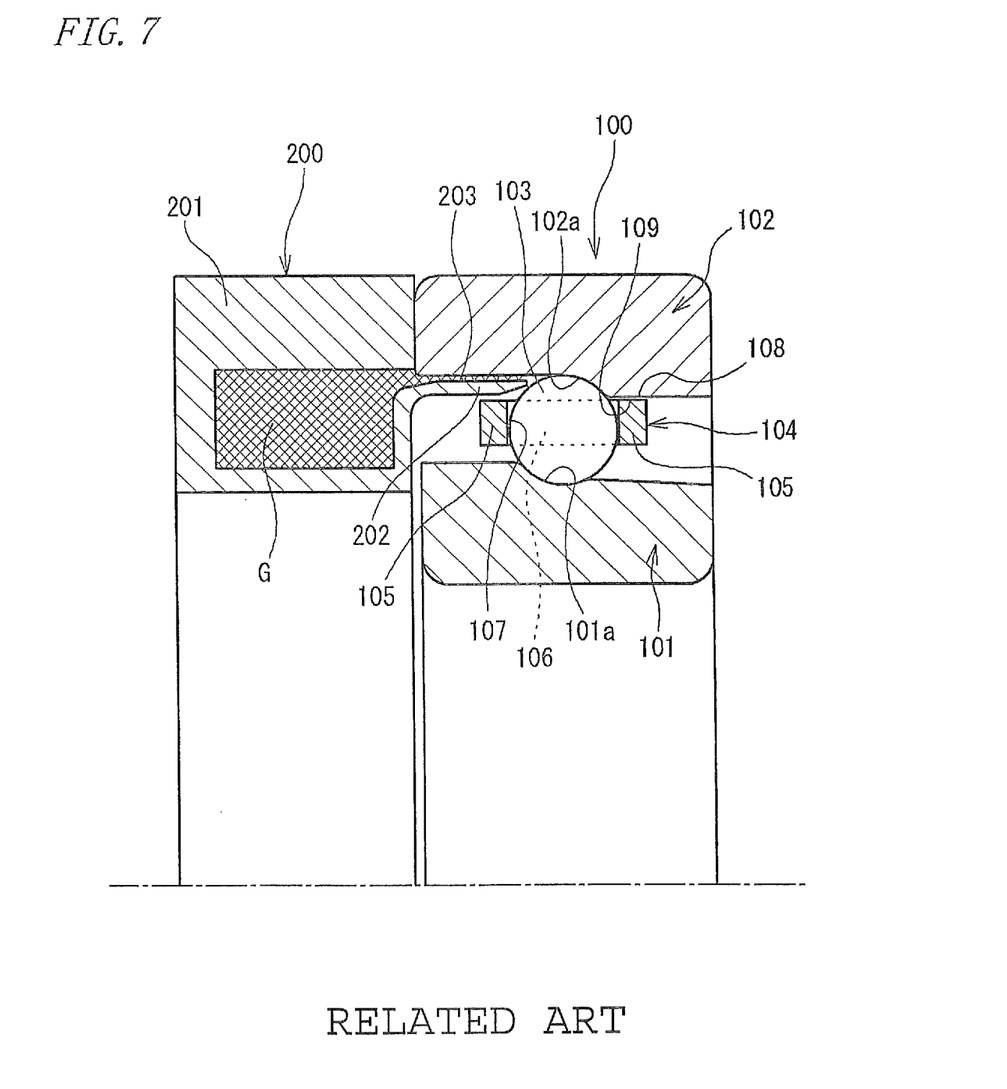
[FIG. 7]
A sectional view showing an essential part of a conventional rolling bearing assembly

FIG. 7 is a sectional view showing an essential part of the rolling bearing assembly equipped with the lubrication device. In the figure, the rolling bearing 100 is an angular contact ball bearing which includes a plurality of balls 103 as rolling elements interposed between a raceway 101a of an inner ring 101 and a raceway 102a of an outer ring 102 and retained by a cage 104 as circumferentially arranged at predetermined intervals.

The cage 104 includes a plurality of cage bar portions 106 extending between a pair of annular portions 105, respective pairs of cage bar portions 106 defining respective pockets 107 therebetween. The pockets retain the balls 103 and are circumferentially arranged at predetermined intervals.

A lubrication device 200 includes an annular grease reservoir member 201 abutting on one end face of the outer ring 102 of the rolling bearing 100, and an annular minute space 203 defined between an inner periphery of the outer ring 102 and an annular gap forming portion 202 projecting from one end of the grease reservoir member 201 such that grease G is introduced into the minute space 203. A distal end of the gap forming portion 202 is spaced close to the ball 103.

The cage 104 includes a guided surface 108 defined by an outer periphery of one (the right-hand one as seen in FIG. 2) of the paired annular portions 105. The cage 104 is guided in rotation by allowing the guided surface 108 thereof to make sliding contact with a guiding surface 109 defined by the inner periphery of the outer ring 102.

In the above rolling bearing assembly, the base oil of the grease G stored in the grease reservoir member 201 infiltrates and migrates into a place in the proximity of the raceway 102a of the outer ring 102 by capillary action of a thickener contained in the grease G, thereby supplying the base oil to the race way 102a of the outer ring 102.

[Citation List]
[Patent Literature]

[Patent Literature 1] Japanese Unexamined Patent Publication No. 2005-180629

SUMMARY OF INVENTION

In the conventional rolling bearing assembly as described above, a source of the base oil of the grease G and the guiding surface 109 of the outer ring 102 are opposed to each other across the raceway 102a. Therefore, it is not easy to supply the base oil to a space between the guided surface 108 of the cage 104 and the guiding surface 109 of the outer ring 102. Particularly in a case where the above-described conventional rolling bearing assembly is used for carrying a shaft which rotates at high speed, such as a main shaft of a machine tool, and the rolling bearing 100 is rotated at high speed, poor lubrication may arise in the space between the guided surface 108 of the cage 104 and the guiding surface 109 of the outer ring 102, resulting in burn-out on the guiding surface 109 of the cage 104.

In view of the foregoing problem, it is an object of the present invention to provide a rolling bearing assembly adapted to prevent the cage from sustaining burn-out on the guide surface thereof in conjunction with the high-speed rotation of the rolling bearing, and to provide a method of forming a lubrication device for use in the same.

The rolling bearing assembly of the invention for achieving the above object comprises: a rolling bearing which includes a plurality of rolling elements interposed between an inner ring and an outer ring thereof and retained by a cage as circumferentially arranged at predetermined intervals and in which the cage is guided in rotation by allowing a guided surface provided at an axial end of an outer periphery thereof to make sliding contact with a guiding surface provided on an inner periphery of the outer ring; and a lubrication device for supplying a lubricant to the rolling bearing, and is characterized in that the lubrication device comprises an annular groove extending along the inner periphery of the outer ring in adjoining relation with the guiding surface of the outer ring and storing a grease therein, and an annular grease reservoir member disposed in proximity to the annular groove and storing a grease therein, and that the grease stored in the grease reservoir member and the grease stored in the annular groove are interconnected by means of the grease present therebetween.

According to the rolling bearing assembly having the above arrangement, the annular groove adjoins the guiding surface of the outer ring so that the base oil of the grease stored in this annular groove can be supplied to a space between the guiding surface of the outer ring and the guided surface of the cage for lubrication of these surfaces. The cage radially vibrates in conjunction with the rotation thereof so that the guided surface of the cage repeatedly beats the supplied base oil against the guiding surface of the outer ring. This induces sequential migration of a part of the base oil toward the raceway of the outer ring so that the raceway is supplied with the base oil. Thus, the bearing assembly can smoothly lubricate the raceways and the rolling elements.

The grease stored in the grease reservoir member and the grease stored in the annular groove are interconnected by means of the grease present therebetween. Therefore, as the base oil of the grease stored in the annular groove is consumed, the capillary action of the thickener contained in the grease causes the base oil of the grease stored in the grease reservoir member to infiltrate and migrate so that the grease stored in the annular groove is replenished with the base oil. Hence, the base oil of the grease stored in the annular groove can be continuously supplied to the guiding surface of the outer ring. As a result, the space between the guided surface of the cage and the guiding surface of the outer ring, the raceways, the rolling elements and the like can be maintained in a well lubricated condition over an extended period of time.

It is preferred in the above rolling bearing assembly that the annular groove is at least partially opposed to the guided surface. In this case, the guided surface of the cage can make a direct contact with the grease stored in the annular groove so that the base oil of the grease can be efficiently supplied to the space between the guided surface of the cage and the guiding surface of the outer ring. This results in a more effective lubrication of the space between the guiding surface and the guided surface, the raceways, the rolling elements and the like.

The rolling bearing assembly of the present invention is adapted to supply the base oil of the grease to the guided surface of the cage and the guiding surface of the outer ring. Therefore, the bearing assembly can prevent the cage from sustaining burn-out on the guided surface thereof even when the rolling bearing is used in high-speed rotation.

It is preferred in the above rolling bearing assembly that at least one axial end of the grease reservoir member is extended into the rolling bearing. In this case, the distance between the grease reservoir member and the annular groove is reduced. It is therefore ensured that as the base oil of the grease stored in the annular groove is consumed, the grease in the annular groove can be reliably replenished with the base oil of the grease stored in the grease reservoir member. During assembly work, the rolling bearing assembly in such an arrangement provides easy interconnection of the grease stored in the grease reservoir member and the grease stored in the annular groove and can suppress air inclusion in the grease.

Further, according to the present invention, there is provided a method of forming a lubrication device in a rolling bearing assembly, the rolling bearing assembly including a rolling bearing which includes a plurality of rolling elements interposed between an inner ring and an outer ring and retained by a cage as circumferentially arranged at predetermined intervals and in which the cage is guided in rotation by allowing a guided surface provided at an axial end of an outer periphery thereof to make sliding contact with a guiding surface provided on an inner periphery of the outer ring; and the lubrication device for supplying a lubricant to the rolling bearing, the method comprising the steps of:

packing a grease in an annular groove extending along the inner periphery of the outer ring in adjoining relation with the guiding surface of the outer ring, packing a grease in an annular oil groove provided in an annular grease reservoir member, forming a grease protrusion on at least one of the grease packed in the annular groove and the grease packed in the grease reservoir member, the grease protrusion projecting toward the other grease, and bringing the grease reservoir member and the annular groove into abutting relation so as to interconnect the grease packed in the grease reservoir member and the grease packed in the annular groove by means of the grease protrusion.

According to the lubrication device forming method having constitutions as described above, at least one of the grease packed in the grease reservoir member and the grease packed in the annular groove is formed with the grease protrusion projecting toward the other grease and hence, the grease packed in the grease reservoir member and the grease packed in the annular groove can be easily and reliably interconnected by means of the grease protrusion. The forming method of the present invention provides an easy and reliable fabrication of the rolling bearing assembly featuring the above-described working effect.

MODES FOR CARRYING OUT THE INVENTION

[Rolling Bearing Assembly]

Next, a rolling bearing assembly according to a preferred embodiment of the invention is described with reference to the accompanying drawings.

Figure 1:
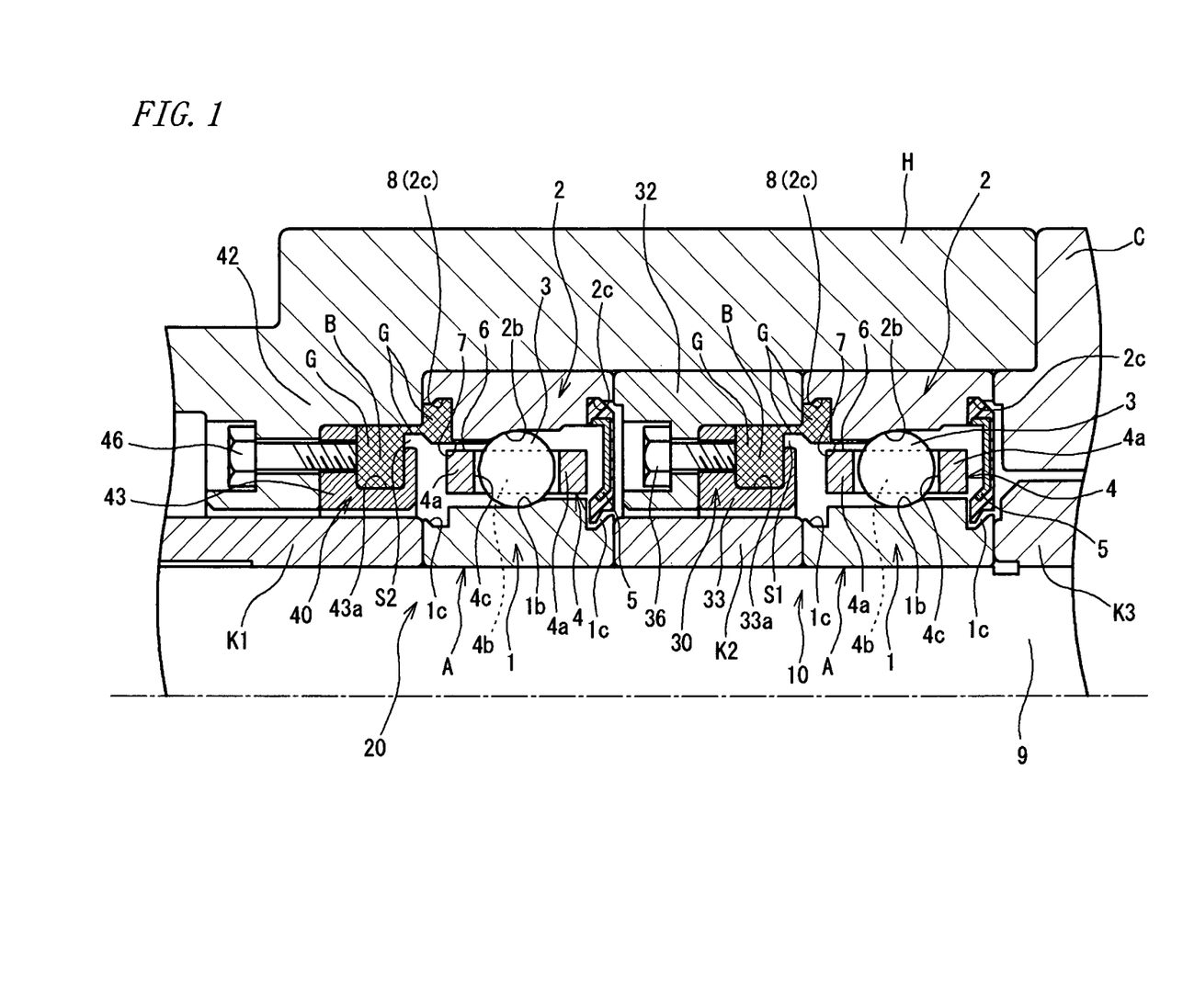
[FIG. 1]
A sectional view showing an essential part for the case where a rolling bearing assembly according to one embodiment of the present invention is mounted on a main shaft of a machine tool.

FIG. 1 is a sectional view showing an essential part for the case where a rolling bearing assembly according to one embodiment of the present invention is mounted on a main shaft of a machine tool.

In this embodiment, two rolling bearing assemblies 10, 20 are disposed in juxtaposition. Each of the rolling bearing assemblies 10, 20 includes an angular contact ball bearing A and a grease reservoir member 30, 40 disposed adjacent to the angular contact ball bearing A.

The angular contact ball bearing A of each rolling bearing assembly 10, 20 includes: an inner ring 1 fitted about a main shaft 9 of a machine tool on an inner periphery thereof; an outer ring 2 fitted in a main shaft housing H on an outer periphery thereof; a plurality of balls 3 as rolling elements interposed between the inner ring 1 and the outer ring 2; a cage 4 for circumferentially retaining the balls 3 at predetermined intervals; and a seal 5 for sealing one axial end of an annular space between the inner ring 1 and the outer ring 2.

An outer periphery of the inner ring 1 is axially centrally formed with an inner ring raceway 1b so as to allow the balls 3 to roll thereon. The outer periphery of the inner ring 1 is further formed with first seal grooves 1c at axially opposite ends thereof. The right-hand one 1c of the first seal grooves 1c as seen in the figure receives an inside circumferential portion (seal lip) of the seal 5. The individual inner rings 1 are axially positioned by means of cylindrical inner ring spacers K1, K2, K3 and the like fitted on the main shaft 9.

An inner periphery of the outer ring 2 is axially centrally formed with an outer ring raceway 2b so as to allow the balls 3 to roll thereon. The inner periphery of the outer ring 2 is further formed with a guiding surface 7 for guiding the rotation of the cage 4. The inner periphery of the outer ring 2 is further formed with second seal grooves 2c at axially opposite ends thereof. The right-hand one 2c of the second seal grooves 2c as seen in the figure receives an outside circumferential portion of the seal 5. The left-hand second seal groove 2c of each outer ring 2 is disposed adjacent to the guiding surface 7. This second seal groove 2c constitutes an annular groove 8 for storing the grease G. This annular groove 8 is previously filled with the grease G. The individual outer rings 2 are axially positioned by means of a diameter-reduced portion 42 of the main shaft housing H, an outer ring spacer 32 and a closure C for closing an opening at one end of the main shaft housing H.

The cage 4 includes: a pair of annular portions 4a axially spaced a predetermined distance from each other; a plurality of cage bars 4b extending between the pair of annular portions 4a; and pockets 4c defined between respective pairs of cage bar portions 4b for retaining the balls 3. The pocket 4c is formed in a circular shape as seen from radially outside of the cage 4. FIG. 1 shows a cross section of the pockets 4c taken on a line including the center of the circular shape thereof. The left-hand one 4a of the paired annular portions 4a, as seen in the figure, has an outer periphery defining a guided surface 6 which is in sliding contact with the guiding surface 7 of the outer ring 6. The above-described annular groove 8 faces the guided surface 6 on the side adjoining the guiding surface 7. Namely, the guided surface 6 partially overlaps with the annular groove 8 in the axial direction. The pocket 4c and the annular groove 8 are so located as not to overlap with each other in the axial direction. It is noted that FIG. 1 shows an exaggerated gap between the guided surface 6 of the cage 4 and the guiding surface 7 of the outer ring 6.

The grease reservoir member 30 of one of the rolling bearing assemblies 10 abuts on an axially left end face of the outer ring 2 and includes the outer ring spacer 32 shaped like a cylinder and fitted in the main shaft housing H of the machine tool on an outer periphery thereof, and an oil storage ring 33 fitted in a diameter-enlarged portion defined by an inner periphery of the outer ring spacer 32. The oil storage ring 33 includes an annular oil groove 33a opening on an outer side thereof so as to store the grease G in an annular space B defined between the oil groove 33a and the outer ring spacer 32. The annular space B is located close to the annular groove 8 of the outer ring 2. Formed between a right wall of the oil groove 33a and the outer ring spacer 32 is an annular gap S1 communicating the annular space B with the annular groove 8. The oil storage ring 33 is fixed to the outer ring spacer 32 with a bolt 36 as restricted in axial movement. The grease G in the annular groove 8 and the grease G in the annular space B are interconnected by means of grease G applied to a portion of the inner periphery of the outer ring spacer 32 that faces the annular gap S1.

The grease reservoir member 40 of the other rolling bearing assembly 20 differs from the grease reservoir member 30 of the former rolling bearing assembly 10 in that a portion equivalent to the above-described outer ring spacer 32 is constituted by the diameter-reduced portion 42 on an inner periphery of the main shaft housing H. Except for this, the grease reservoir member 40 is basically constructed the same way as the above grease reservoir member 30. The grease reservoir member 40 includes an oil storage ring 43 including an annular oil groove 43a opening on an outer peripheral side thereof so as to store the grease G in an annular space B defined between the oil groove 43a and the diameter-reduced portion 42. Formed between a right wall of the oil groove 43a and the diameter-reduced portion 42 is an annular gap S2 communicating the annular space B with the annular groove 8 so that the grease G in the annular groove 8 and the grease G in the annular space B are interconnected by means of grease G applied onto a portion of an inner periphery of the diameter-reduced portion 42 that faces the annular gap S2. The oil storage ring 43 is fixed to the diameter-reduced portion 42 with a bolt 46 to be restricted in axial movement.

In the rolling bearing assembly 10, 20, the grease reservoir member 30, 40, the annular groove 8 and the grease G constitute a lubrication device for supplying the angular contact ball bearing A with a base oil contained in the grease G.

The above-described grease G may contain urea compound, Ba complex soap, Li complex soap or the like as a thickener, and ester, poly-α-olefin or the like as the base oil.

The rolling bearing assembly 10, 20 having the above-described arrangement stores the grease G in the annular groove 8 adjoining the guiding surface 7 and hence, is capable of supplying the base oil of the grease G to the space between the guided surface 6 of the cage 4 and the guiding surface 7 of the outer ring 2 for favorably lubricating the guiding surface 7 and the guided surface 6. Therefore, the bearing assembly can prevent the cage 4 from sustaining burn-out on the guided surface 6 thereof even when the main shaft 9 is rotated at high speed. When the cage 4 radially vibrates in conjunction with the rotation thereof, the guided surface 6 of the cage 4 is repeatedly brought into abutment against the guiding surface 7 of the outer ring 2, so that the base oil supplied to the space between the guided surface 6 of the cage 4 and the guiding surface 7 of the outer ring 2 can be repeatedly beaten against the guided surface 6 and the guiding surface 7. This induces sequential migration of a part of the base oil toward the raceway 2b of the outer ring 2 so that the raceway 2b is supplied with the base oil. Hence, the bearing assembly can smoothly lubricate the raceways 1b, 2b and the balls 3.

Particularly, the above embodiment is arranged such that the above annular groove 8 faces the guided surface 6 of the cage 4 on the side adjoining the guiding surface 7, so that the guided surface 6 can come into direct contact against the grease G stored in the annular groove 8. Accordingly, the base oil of the grease G stored in the annular groove 8 can be efficiently supplied to the space between the guided surface 6 and the guiding surface 7. This results in a more effective lubrication between the guided surface 6 and the guiding surface 7, and a more effective lubrication of the individual raceways 1b, 2b and the balls 3.

Furthermore, the grease G stored in the annular space B and the grease G stored in the annular groove 8 are interconnected by means of the grease G present therebetween. Therefore, as the base oil of the grease G stored in the annular groove 8 is consumed, the capillary action of the thickener contained in the grease G causes the base oil of the grease G stored in the annular space B to infiltrate into the grease G stored in the annular groove 8. Therefore, the bearing assembly can continuously supply the base oil of the grease G stored in the annular groove 8 to the guiding surface 7 of the outer ring 2. As a result, lubrication between the guided surface 6 and the guiding surface 7, and lubrication of the individual raceways 1b, 2b and the balls 3 can be maintained in good conditions over an extended period of time.

The above-described embodiment is designed to cause the base oil of the grease G stored in the grease reservoir member 30, 40 to infiltrate and migrate to the grease G stored in the annular groove 8, thereby supplying the base oil to a part in need of lubrication. Thus, the embodiment can provide a low-cost, simple lubrication structure.

[Modifications of Rolling Bearing Assembly]

The present invention is not limited to the above embodiment. While the above embodiment has the arrangement wherein the annular groove 8 is partially opposed to the guided surface 6 of the cage 4, an alternative arrangement, for example, may be made wherein the annular groove 8 is located close to the guided surface 6 without partially facing the same.

Figure 2:
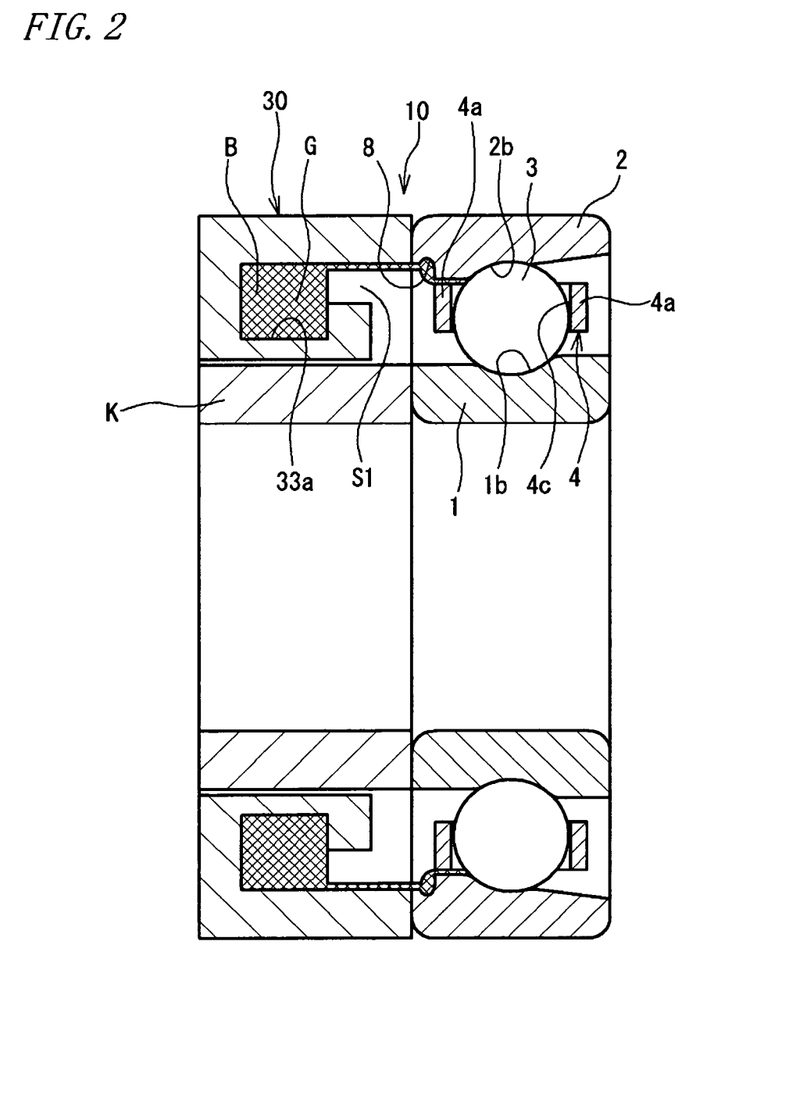
[FIG. 2]
A sectional view showing a rolling bearing assembly according to another embodiment hereof.

While the above embodiment has the arrangement wherein the annular groove 8 is defined by the second seal groove 2c of the outer ring 2, an angular contact ball bearing A without a seal may include the annular groove 8 formed on the inner periphery surface 2a of the outer ring 2 (see FIG. 2).

Figure 3:
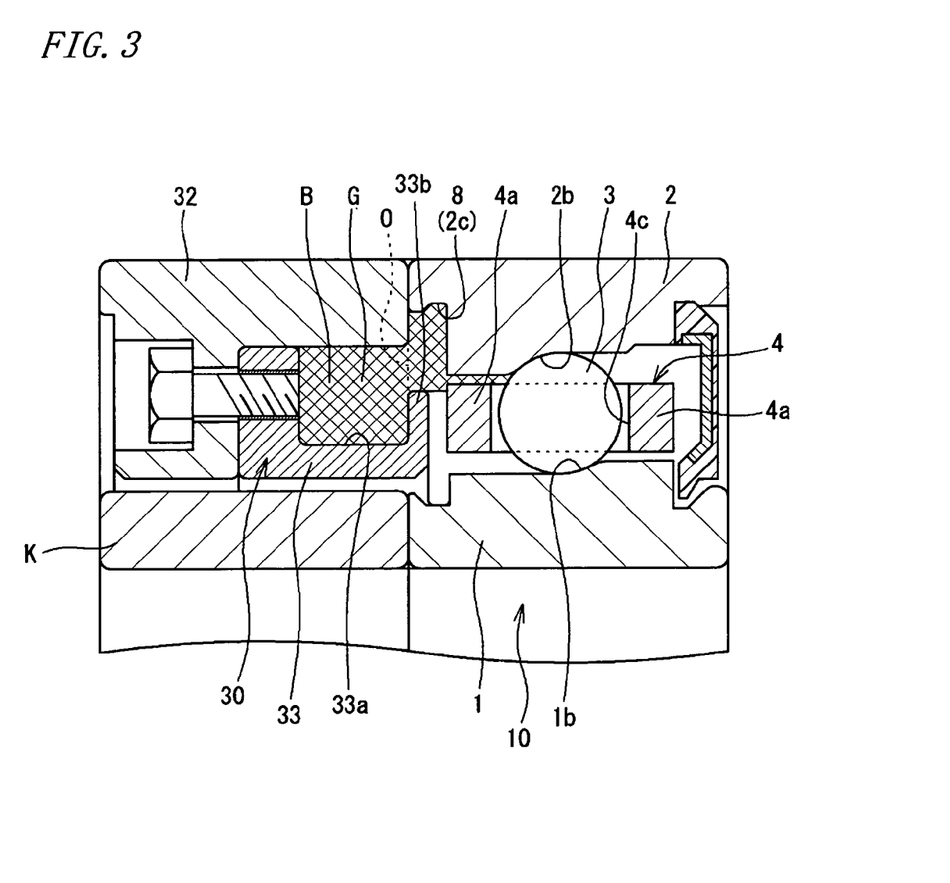
[FIG. 3]
A sectional view showing a rolling bearing assembly according to still another embodiment hereof.

At least an end 33b of the grease reservoir member 30 may be extended into the rolling bearing 10 (see FIG. 3).

In the rolling bearing assembly having this arrangement, a distance between the grease reservoir member 30 and the annular groove 8 is shorter than that of the rolling bearing assembly according to the above-described embodiments (FIG. 1 and FIG. 2). Therefore, this rolling bearing assembly can more reliably replenish the grease in the annular groove with the base oil of the grease stored in the grease reservoir member. Moreover, during assembly work, the rolling bearing assembly having this arrangement not only facilitates the interconnection of the grease stored in the grease reservoir member and the grease stored in the annular'groove, but also suppresses the air inclusion in the grease. Furthermore, such a rolling bearing assembly provides an easy fabrication of the lubrication device.

In the rolling bearing assembly having this arrangement, the grease in the annular groove 8 and the grease in the annular space B are connected with each other at a larger contact area than that of the rolling bearing assembly of the above-described embodiments (FIG. 1 and FIG. 2). Therefore, the rolling bearing assembly having this arrangement can store a larger amount of grease.

The above-described angular contact ball bearing A as the rolling bearing may be replaced by a deep groove ball bearing including a crown-type cage or otherwise by a cylindrical roller bearing or tapered roller bearing.

[Method of Forming Lubrication Device for Rolling Bearing Assembly]

Next, a method of forming a lubrication device for the rolling bearing assembly according to a preferred embodiment of the invention is described with reference to the accompanying drawings.

Figure 4:
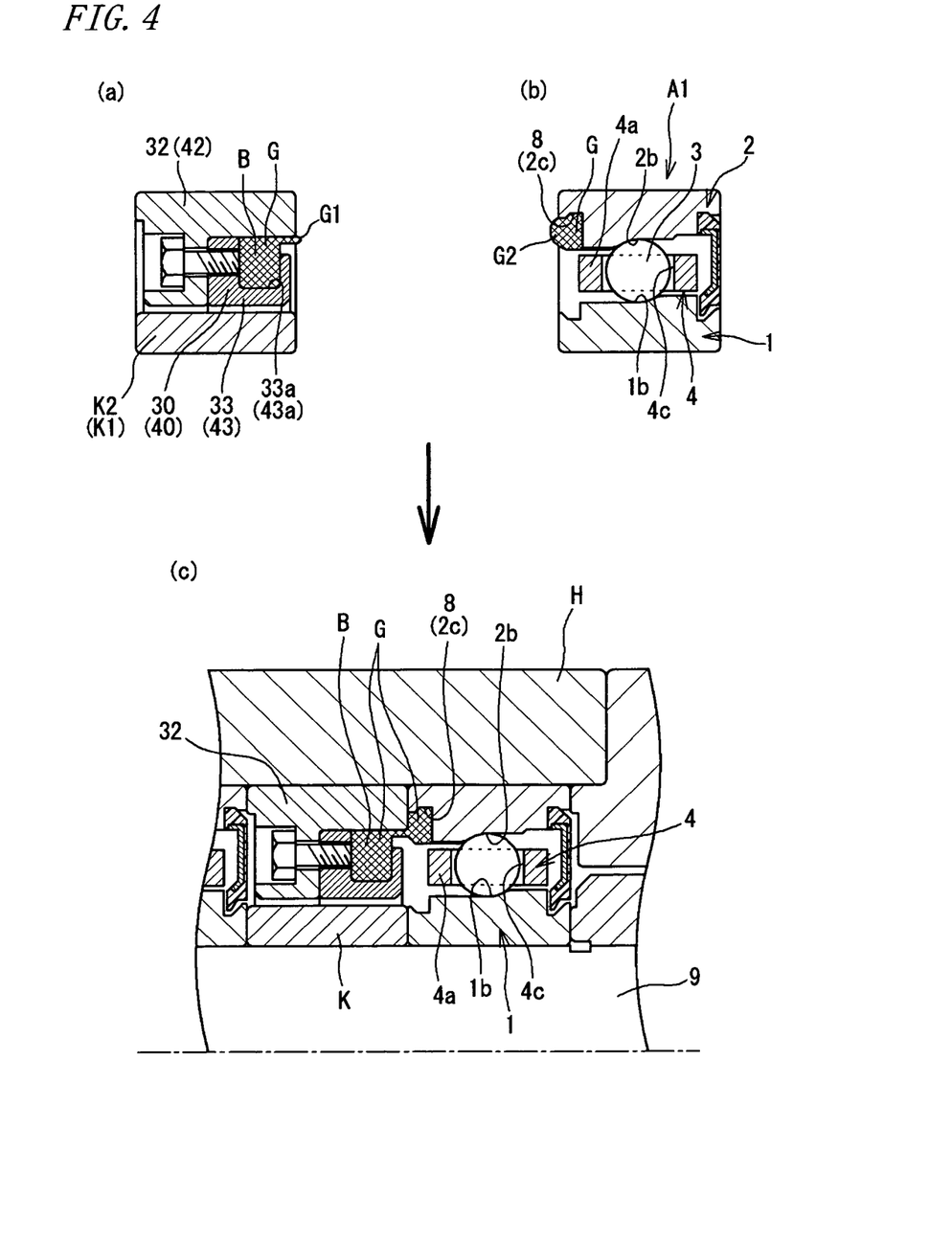
[FIG. 4]
A process chart showing the steps of a method of forming a lubrication device for the rolling bearing assembly according to one embodiment of the invention.

FIG. 4 is a process chart showing the steps of the method of forming the lubrication device for the rolling bearing assembly according to one embodiment of the invention. The following description is made on, by way of example, the steps of the method of forming the lubrication device for the rolling bearing assembly shown in FIG. 1.

According to the forming method of the embodiment, the grease G is first packed in the annular groove 8 of a main body A1 of the angular contact ball bearing and the annular oil groove 33a of the grease reservoir member 30 (40) (see FIG. 4(a) and FIG. 4(b)). At this time, the grease G packed in the annular groove 8 and the grease G packed in the oil groove 33a are formed with grease protrusions G1, G2 projecting toward each other.

Figure 5:
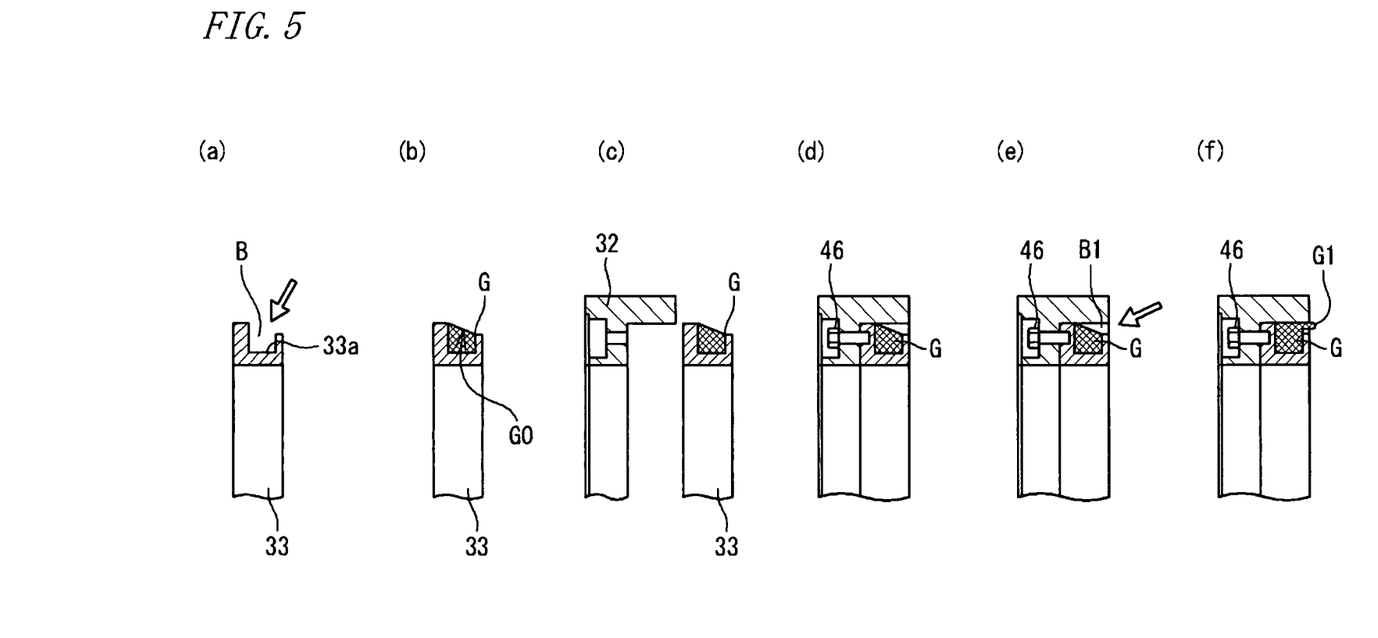
[FIG. 5]
A process chart showing the steps of a grease filling operation shown in FIG. 4.

The grease G is packed in the oil groove 33a (annular space B) by taking the steps shown in FIG. 5, for example.

First, the outer ring spacer 32, oil storage ring 33 and bolt 46 are each degreased and washed [(washing step), see FIG. 5(a)].

Next, the oil groove 33a on an outer periphery of the oil storage ring 33 is filled with the grease G [(grease filling step), see FIG. 5(b)]. In this process, the grease G is injected in a manner such that the grease G in the oil groove 33a defines a cross-sectional shape progressively decreased in radial dimension toward a lateral side of the oil storage ring 33 as seen in FIG. 5.

Subsequently, this oil storage ring 33 is fitted in the outer ring spacer 32 [(attaching step), see FIG. 5(c)]. In this step, as described above, the grease G is injected in the oil groove 33a in such a manner as to be progressively decreased in the radial dimension toward the lateral side of the oil storage ring 33 as seen in FIG. 5. Therefore, this step can suppress the air inclusion in the grease G and prevent an unwanted adhesion of the grease G to the inner periphery of the outer ring spacer 32.

Next, the outer ring spacer 32 and the oil storage ring 33 are fixed together with the bolt 46 as restricted in the axial movement [(fixing step), see FIG. 5(d)].

Subsequently, an annular space B1 formed between the outer ring spacer 32 and the oil storage ring 33 is replenished with the grease G. At this time, the grease G is protruded to form the grease protrusion G1 [(grease replenishing step), see FIG. 5(e) and FIG. 5(f)].

The annular space B may be packed with the grease G in this manner.

While FIG. 5 illustrates the exemplary steps of packing the grease in the oil groove 33a of the grease reservoir member 33, the same steps may be taken to pack the grease in the oil groove 43a of the grease reservoir member 43.

Figure 6:
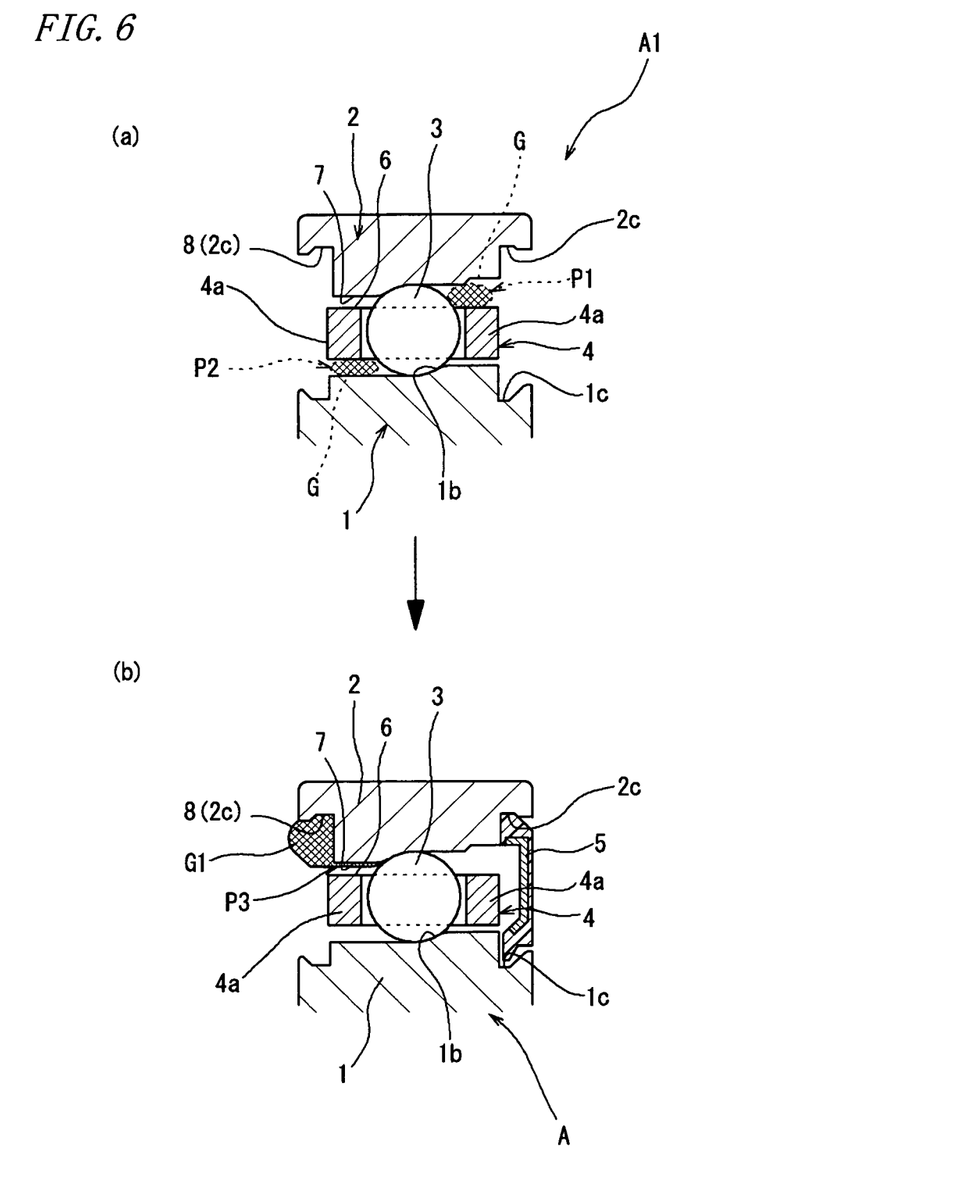
[FIG. 6]
A step chart showing the steps of the grease filling operation shown in FIG. 4.

On the other hand, the grease G may be packed in the annular groove 8 by taking the steps shown in FIG. 6, for example. Firstly, in the main body A1 of the angular contact ball bearing, the grease G is packed in an annular space P1 formed between the inner periphery of the outer ring 2 and an outer-ring side end of the annular portion 4a of the cage 4 and an annular space P2 formed between the outer periphery of the inner ring 1 and an inner-ring side end of the annular portion 4a of the cage 4 (see FIG. 6(a)). It is noted here that the annular space P1 is a space formed on a side on which the bearing is fitted with the seal 5 and that the annular space P2 is a space formed on a side of the bearing that is opposite the grease reservoir member 30 (40).

Next, the balls 3 in the angular contact ball bearing A1 are brought into rolling motion such that the grease G injected in the annular spaces P1 and P2 spreads via the surfaces of the balls 3 to form a grease coat P3 over the guiding surface 7 on the inner periphery of the outer ring 2. Subsequently, the annular groove 8 (second seal groove 2C) is further replenished with the grease (see FIG. 6(b)). In this process, the grease G is replenished in a manner such that the grease may protrude from an end face of the main body A of the angular contact ball bearing that is opposite the grease reservoir member 30 (40). Thus is formed the grease protrusion G2.

The annular groove 8 may be packed with the grease G in this manner.

Next, the grease reservoir member 30 (40) and the annular groove 8 are brought into abutting relation so as to connect the grease G packed in the grease reservoir member 30 (40) with the grease G packed in the annular groove 8 by means of the grease protrusions G1, G2 (see FIG. 4C).

At this time, the protrusion G1 of the grease G in the grease reservoir member 30 (40) and the protrusion G2 of the grease G in the angular contact ball bearing A are brought into contact with each other simply by attaching the grease reservoir member 30 (40) and the angular contact ball bearing A to the housing H and locating the grease reservoir member 30 (40) and the angular contact ball bearing A in a manner such that the grease reservoir member 30 (40) abuts on the annular groove 8. Thus, the grease G packed in the grease reservoir member 30 (40) and the grease G packed in the annular groove 8 of the angular contact ball bearing A are connected with each other.

In this manner, the forming method of the present embodiment can easily and reliably connect the grease G packed in the grease reservoir member 30 (40) with the grease G packed in the annular groove 8 of the angular contact ball bearing A.

It is noted that the present invention is not limited to the foregoing embodiments. In grease packing, any one of the grease G packed in the grease reservoir member 30 (40) and the grease G packed in the annular groove 8 of the angular contact ball bearing A may singularly be formed with the grease protrusion projecting toward the other grease G. In a case where only the grease G packed in the grease reservoir member 30 (40) is formed with the grease protrusion, for example, the grease reservoir member, when attached to the housing H, may be replenished with the grease in a manner such that the grease protrudes from an end of the grease reservoir member that is opposite the angular contact ball bearing A and toward the angular contact ball bearing A. In a case where only the grease packed in the annular groove 8 of the angular contact ball bearing A is formed with the grease protrusion, the annular groove of the angular contact ball bearing, when attached to the housing, may be replenished with the grease in a manner such that the grease protrudes from an end of annular groove that is opposite the grease reservoir member 30 (40) and toward the grease reservoir member 30 (40).

[Description of Reference Characters]

1: inner ring, 2: outer ring, 3: ball (rolling element), 4: cage, 6: guided surface, 7: guiding surface, 8: annular groove, 10,20: rolling bearing assembly, 30.40: grease reservoir member, G: grease, G1, G2: grease protrusion, S: annular gap

The invention claimed is:

1. A rolling bearing assembly, comprising:
   a rolling bearing comprising a plurality of rolling elements interposed between an inner ring and an outer ring thereof and retained by a cage as circumferentially arranged at predetermined intervals and, in which, the cage is guided in a rotation by allowing a guided surface provided at an axial end of an outer periphery thereof to make sliding contact with a guiding surface provided on an inner periphery of the outer ring; and
   a lubrication device for supplying a lubricant to the rolling bearing,
   wherein the lubrication device comprises:
      an annular groove extending along the inner periphery of the outer ring in adjoining relation with the guiding surface of the outer ring and storing a grease therein; and
      an annular grease reservoir member disposed in proximity to the annular groove and storing a grease therein, and
   wherein the grease stored in the grease reservoir member and the grease stored in the annular groove are interconnected by the grease present therebetween.

2. The rolling bearing assembly according to claim 1, wherein the annular groove is partially opposed to the guided surface.

3. The rolling bearing assembly according to claim 2, wherein at least one axial end of the grease reservoir member is introduced into the rolling bearing.

4. The rolling bearing assembly according to claim 1, wherein at least one axial end of the grease reservoir member is introduced into the rolling bearing.

5. A method of forming a lubrication device in a rolling bearing assembly, the rolling bearing assembly including a rolling bearing comprising a plurality of rolling elements interposed between an inner ring and an outer ring thereof and retained by a cage as circumferentially arranged at predetermined intervals and in which the cage is guided in rotation by allowing a guided surface provided at an axial end of an outer periphery thereof to make a sliding contact with a guiding surface provided on an inner periphery of the outer ring and the lubrication device for supplying a lubricant to the rolling bearing, the method comprising:
   packing a grease in an annular groove extending along the inner periphery of the outer ring in an adjoining relation with the guiding surface of the outer ring;
   packing a grease in an annular oil groove provided in an annular grease reservoir member;
   forming a grease protrusion on at least one of the grease packed in the annular groove and the grease packed in the grease reservoir member, the grease protrusion projecting toward the other grease; and
   bringing the grease reservoir member and the annular groove into an abutting relation so as to interconnect the grease packed in the grease reservoir member and the grease packed in the annular groove by the grease protrusion.

* * * * *

UNITED STATES PATENT AND TRADEMARK OFFICE
CERTIFICATE OF CORRECTION

PATENT NO. : 8,439,570 B2  
APPLICATION NO. : 12/737536  
DATED : May 14, 2013  
INVENTOR(S) : Hiroyuki Urano It is certified that error appears in the above-identified patent and that said Letters Patent is hereby corrected as shown below:

On the title page items:

(22) PCT Filed: ~~November 24, 2009~~ should be July 22, 2009

(87) PCT Pub. No.: ~~WO2010/064376~~ should be WO2010/010897

PCT Pub. Date: ~~June 10, 2010~~ should be January 28, 2010

Signed and Sealed this  
Twenty-third Day of July, 2013

Teresa Stanek Rea  
*Acting Director of the United States Patent and Trademark Office*